(12) United States Patent
Renard

(10) Patent No.: US 7,537,335 B2
(45) Date of Patent: May 26, 2009

(54) HYBRID LENS WITH POLARIZER FOR EYEGLASSES

(76) Inventor: Paula A. Renard, 47 Bundy Cir., Buellton, CA (US) 93427

( * ) Notice: Subject to any disclaimer, the term of this patent is extended or adjusted under 35 U.S.C. 154(b) by 224 days.

(21) Appl. No.: 11/099,174

(22) Filed: Apr. 4, 2005

(65) Prior Publication Data

US 2005/0168682 A1    Aug. 4, 2005

Related U.S. Application Data

(63) Continuation-in-part of application No. 10/342,012, filed on Jan. 13, 2003, now abandoned.

(60) Provisional application No. 60/349,537, filed on Jan. 16, 2002, provisional application No. 60/355,673, filed on Feb. 6, 2002.

(51) Int. Cl.
    *G02C 7/16* (2006.01)
(52) U.S. Cl. .......................................... 351/45; 351/46
(58) Field of Classification Search .................. 351/45, 351/46, 44, 41, 165, 159, 49, 158
See application file for complete search history.

(56) References Cited

U.S. PATENT DOCUMENTS 3,628,854 A * 12/1971 Jampolsky .................. 351/175
5,252,997 A * 10/1993 Christenbery ................ 351/49
5,452,027 A *  9/1995 Tylec .......................... 351/46

* cited by examiner

*Primary Examiner*—Hung X Dang
(74) *Attorney, Agent, or Firm*—Laura Tunnell

(57) ABSTRACT

A hybrid lens for eyeglasses comprising a frame-mountable, optically transparent lens having an anterior surface and a posterior surface. The anterior surface has a surface area. A polarizing segment is affixed to the optically transparent lens such that the polarizing segment is coextensive with a midportion of the anterior surface area of the optically transparent lens wherein the midportion of the surface area of the optically transparent lens that is coextensive with the polarizing segment is less than the anterior surface area of the lens. In a preferred embodiment, the optically transparent lens has a top edge, a bottom edge and a geometric center. An imaginary horizontal centerline drawn through the geometric center divides the optically transparent lens into an upper portion and a lower portion. The polarizer segment comprising the hybrid lens is a relatively narrow, elongate horizontal strip disposed within the lower portion of the optically transparent lens adjacent to, or overlying the centerline. The polarizing segment may be affixed to either the anterior or posterior surface of the optically transparent lens by adhesive means or it may be a layer within a laminate lens structure. Eyewear comprising hybrid lenses reduces glare due to polarized light and permits the wearer to view in a variety of lighting conditions by slightly moving the head.

5 Claims, 3 Drawing Sheets

HYBRID LENS WITH POLARIZER FOR EYEGLASSES

This application is a continuation-in-part of U.S. patent application Ser. No. 10/342,012, filed Jan. 13, 2003 now abandoned, which claims the benefit of U.S. Provisional Application Nos. 60/349,537, filed Jan. 16, 2002, and 60/355, 673, filed Feb. 6, 2002.

BACKGROUND OF THE INVENTION

1. Field of the Invention

The present invention relates to eyeglasses having lenses wherein a portion of each lens includes an element that reduces the intensity of polarized light passing therethrough.

2. Prior Art

Polarized glasses, i.e., spectacles comprised of a pair of lenses that at least partially blocks the intensity of polarized light passing therethrough, are well known in the art for reducing glare from reflected light. In such polarizing lenses, a sheet polarizer is coextensive with substantially the entire lens. A "sheet polarizer" of the type referred to above is a polymeric film used for producing polarized light from unpolarized light. An example of a sheet polarizer that is commonly used for producing polarized light is a stretched sheet of a colorless polymeric film treated with an iodine solution. The most commonly used polarizer sheet includes a plurality of chains of polymer molecules such as, for example, polyvinyl alcohol (PVA), wherein each of the PVA polymer chains has a long axis, or "polarizer axis", which is parallel to the long axis of all other PVA chains, and containing conductive iodine atoms.

If a sheet polarizer is incorporated into a lens such as, for example, by stretching a PVA film over an optically transparent (or tinted) lens during the molding process, wherein the long axis of the sheet polarizer (i.e., the polarizer axis) is vertically oriented when the lens is mounted in a frame, the sheet polarizer will substantially block the passage of horizontally polarized light therethrough, thereby reducing glare associated with light reflected from a horizontal surface (i.e., horizontally polarized light). While glare reduction is an advantage, such sheet polarizers also reduce the intensity of circularly polarized light passing therethrough which makes it difficult to see in a suddenly darkened environment. There is a need for eyeglasses that provide the glare reduction advantage of polarized lenses while retaining the ability to transmit substantially all of the light within a field of view to the pupil under reduced lighting conditions such as is encountered during night driving.

SUMMARY

A hybrid lens for eyeglasses comprising a frame-mountable, optically transparent lens having an anterior surface and a posterior surface. The anterior and posterior surfaces have respective anterior and posterior surface areas. A polarizing segment is affixed to the optically transparent lens such that the polarizing segment is disposed within a midportion of the anterior surface area of the optically transparent lens. The portion of the surface area of the optically transparent lens that is coextensive with the polarizing segment is less than or equal to one third of the anterior surface area of the lens. A portion of the lens both above and below the polarizer segment is optically transparent. The polarizing segment is preferably an elongate strip of sheet polarizer having a strip length that is less than or equal to the width of the lens, and a polarizer axis orthogonal to the strip length. In a preferred embodiment, the optically transparent lens has a top edge, a bottom edge, a width and a center. An imaginary line drawn horizontally through the center of the lens defines a centerline that divides the optically transparent lens into an upper portion and a lower portion. The polarizer segment comprising the hybrid lens is affixed to the lens with the strip length parallel to the centerline and preferably disposed entirely within a midportion of the optically transparent lens that includes the centerline. The polarizing segment may be affixed to either the anterior or posterior surface of the optically transparent lens by adhesive means or it may be integrated into the lens as a layer within a laminate lens structure.

The present invention discloses a hybrid eyeglass lens; combining a polarizing segment comprising a relatively narrow strip of a polarizer film and a substantially optically transparent carrier lens that may include anti-reflective coatings. The invention provides a ground prescription lens or a non-prescription lens of any lens design, i.e. single vision, progressive multi-focals, or safety lenses and goggles, with a small, polarized segment placed onto or into the lens as is done with large (i.e., lens-sized polarizer film) when fabricating prior art polarized sunglass lenses. This improvement allows the wearer of the lenses to instantly (with the slightest tip of the head) look through the small polarized segment of the lens to reduce glare as needed for better vision and comfort.

The small, polarized segment is disposed at a position within the lens that enables the wearer to view an image through all areas of the optical lens system, (i.e. distance area, as in a progressive lens; peripheral areas, and the portion of the lens below the polarized segment.) The hybrid lens also preferably incorporates an anti reflective coating on the front (anterior) and back (posterior) surfaces to increase light transmission throughout the lens.

The benefits of the hybrid lens in accordance with the present invention are realized during both day and night use. Eyeglasses comprising the present hybrid lens system can be worn during the day in bright sunny conditions. While driving an automobile, in order to use the lenses in bright daylight, the wearer slightly tips his/her head and the polarized segment provides a viewable polarized area about the size of the windshield area of the car, blocking out glare in the driver's visual field. If the wearer happens to enter a parking structure, a dark tunnel or shaded canyon area, the wearer needs merely to return his/her head to the normal position and view above (or below) the polarized zone to have optimum light transmission for viewing in the darkened environment. Then, upon reentering bright daylight, the wearer merely returns his/her head to a position that enables viewing through the polarized segment.

The hybrid lens system can be worn in low light conditions. Because the polarized segment is thin (TBD), only a section of the lens approximately the size of the projection of the windshield on the lens need exhibit a slightly darkened polarized quality. This allows the wearer unobstructed light transmission above, below and to the sides of the polarized segment for viewing the roadway, dashboard control panel, maps etc. When needed, the wearer can look through the polarized segment to alleviate glare from the headlights of other cars, reflector type road signs and water on the roadway.

The features of the invention believed to be novel are set forth with particularity in the appended claims. However the invention itself, both as to organization and method of operation, together with further objects and advantages thereof may be best understood by reference to the following description taken in conjunction with the accompanying drawings.

DESCRIPTION OF THE PREFERRED EMBODIMENTS

Figure 1:
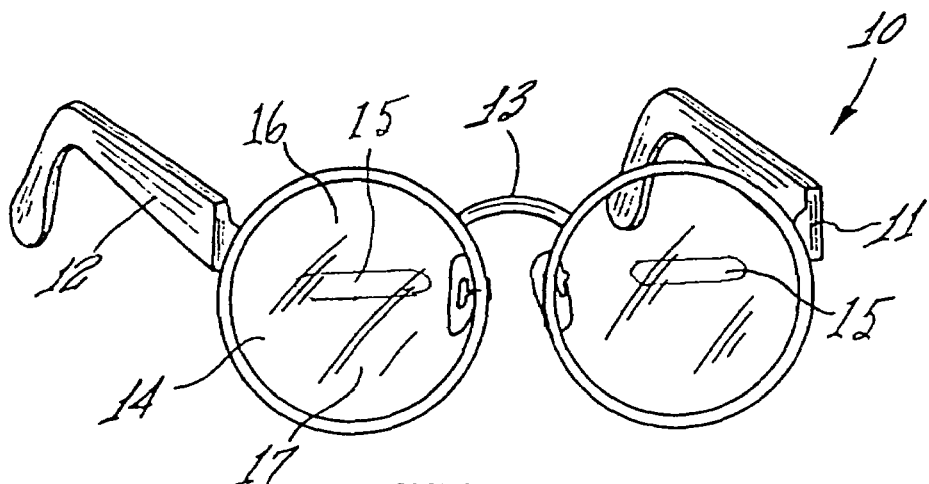
FIG. 1 is a perspective view of eyewear illustrating the position of a polarizing segment of a hybrid lens in accordance with the present invention.

Turning now to FIG. 1, an example of eyewear is presented illustrating certain portions of the lenses comprising the eyewear which is particularly suitable for the incorporation of a polarizing segment in accordance with the present invention. The eyewear 10 is intended to be generic and may be a pair of eyeglasses (spectacles), swim goggles, protective goggles or any form of prescription or nonprescription eyewear. The eyewear 10 comprises a frame portion 11, which serves to support a pair of lenses 14. The eyewear is attached to a wearer (not shown in FIG. 1) by means of a temple portion 12 and a bridge portion 13, which, in use, rests against the skin covering the bridge of a wearer's nose and is in intimate contact therewith. A portion of the lens 14 includes a polarizing segment 15 disposed thereon. The lens 14 includes an optically transparent upper viewing area 16 disposed above the polarizing segment 15, and an optically transparent lower viewing area 17 disposed below the polarizing segment 15.

Figure 2:
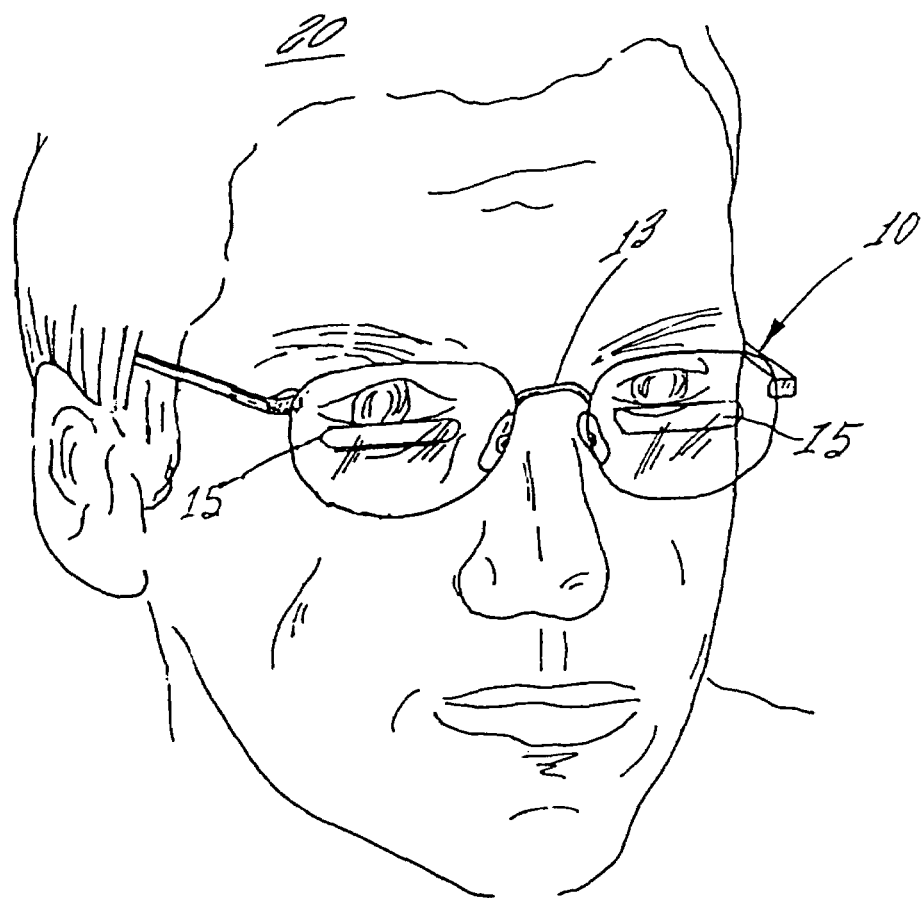
FIG. 2 is a perspective view of a person wearing eyewear in accordance with the present invention showing in plan view the preferred placement of the polarizing segment within the midportion of the lens.

FIG. 2 is a perspective view of a person 20 wearing an embodiment of the eyewear 10 in accordance with the present invention, the figure further illustrating, in plan view, a preferred placement of the polarizing segment 15 on the lenses 14 comprising the eyewear. It is an important feature of the present invention that the hybrid lenses comprising the eyewear have optically transparent viewing areas above and below the polarizing segment 15 wherethrough either unpolarized or polarized light is transmitted with minimal attenuation of the light intensity relative to the portion of the lens comprising the polarized segment.

Figure 3:
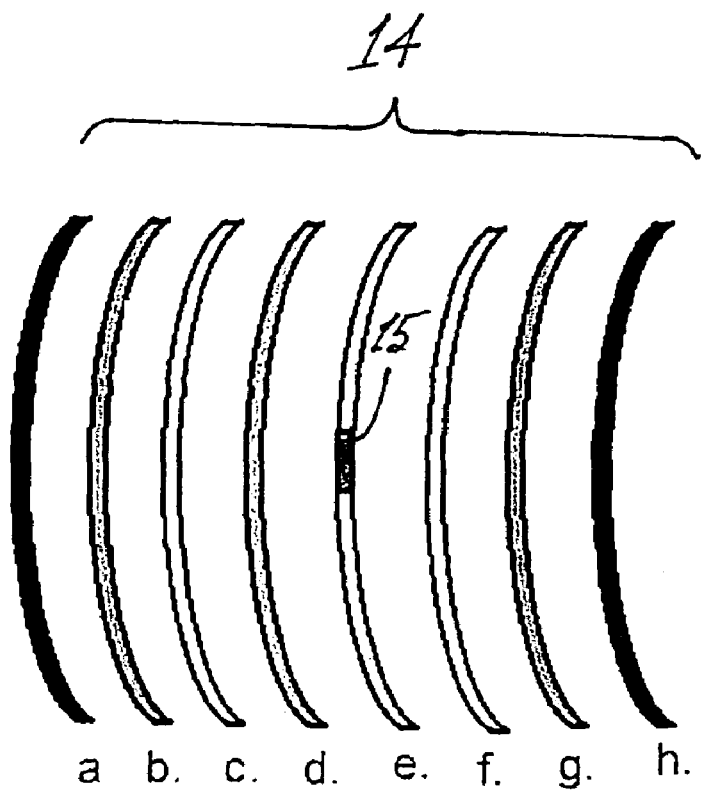
FIG. 3 is an exploded side view of a hybrid lens comprising a polarized segment in accordance with a preferred embodiment of the present invention showing the relationship of the various optical elements comprising the hybrid lens.

FIG. 3 is an exploded side view of a plastic hybrid lens comprising a polarized segment in accordance with a preferred embodiment of the present invention showing the relationship of the various optical elements comprising the hybrid lens. In the preferred embodiment, the hybrid lens 14 preferably comprises: (a) an anti-reflective coating; (b) a hard coat which may also block ultraviolet light; (c) an anterior lens; (d) an optional photogray transition layer; (e) an optically transmissive layer supporting a polarizing segment 15; (f) a posterior lens; (g) a hard coat; and (h) an anti-reflective coating. If glass lenses (as opposed to plastic lenses) are employed for the anterior 3(c) and posterior 3(f) lenses, the hard coats 3(b) and 3(g) may be omitted.

Figure 4:
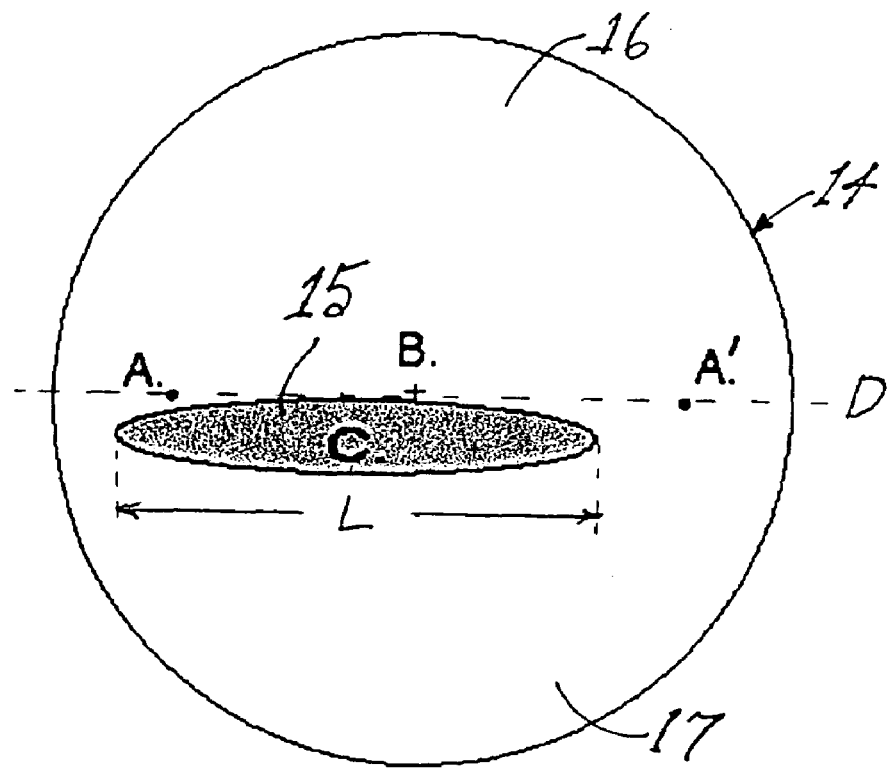
FIG. 4 is a front view of a lens blank design for the left eye showing the placement of the polarizing segment on the lens, right lens blanks (not shown) being a mirror image of the left eye blank.
Figure 5:
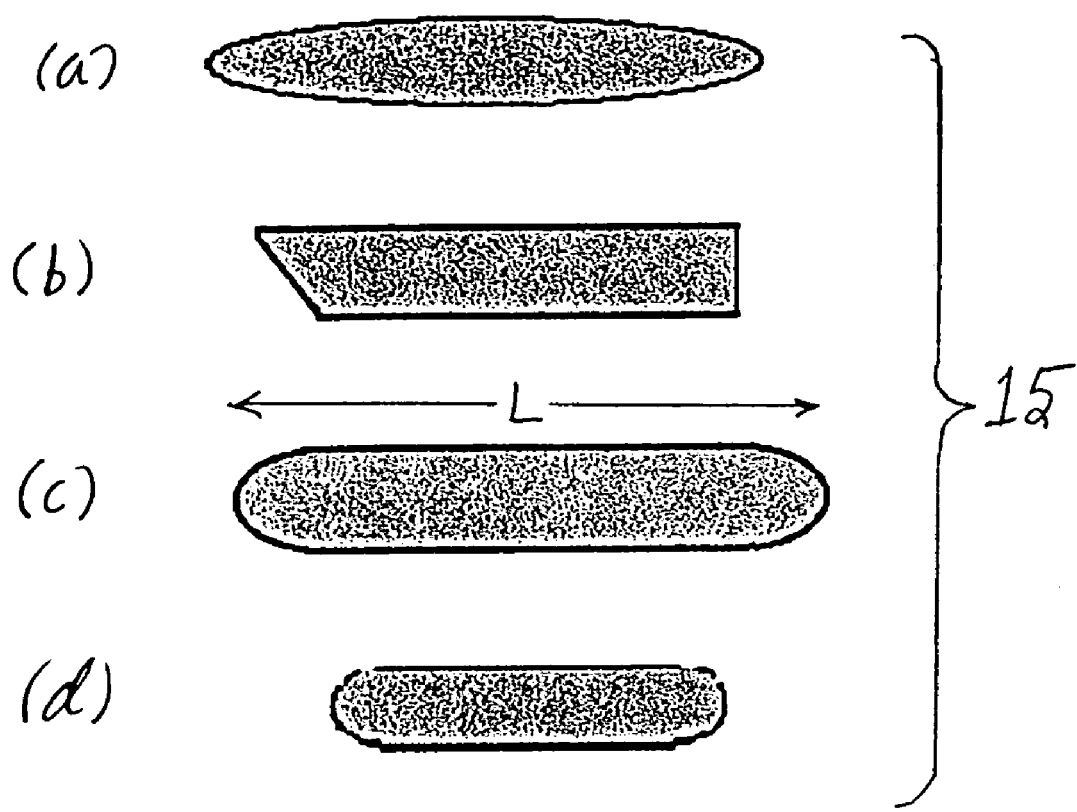
FIG. 5 provides examples of polarizer segments having a plurality of shapes and sizes that may be affixed to an optically transparent lens to provide a hybrid lens of the present invention.

It is, in many instances, desirable to affix a polarized segment to existing eyewear that otherwise lacks means for glare reduction. FIG. 4 is a front view of a left lens blank design for the left eye, showing the placement of the polarizing segment on the lens; the right lens blanks (not shown) being a mirror image of the left lens blank. The polarizing segment 15 is an elongate strip of polarizer film having a strip length L and a polarizer axis oriented orthogonally with respect to the strip length L. The polarizer segment 15 may be provided in different sizes and shapes, some of which are illustrated in FIG. 5a-d. Returning now to FIG. 4, a lens 14 is normally provided with a pair of manufacturer's blocking markers A and A' and have a geometric center B disposed midway between the blocking markers. An imaginary centerline D (shown in phantom in FIG. 4) connecting the blocking markers A and A' bisects the lens into an upper portion 16 and a lower portion 17. In an affixed embodiment of a hybrid lens in accordance with the present invention, a polarized segment 15 is affixed to the transparent portion of the lens 14 by adhesive means as shown in FIG. 4, the polarizing segment 15 being disposed on the transparent portion of the lens 14 slightly below the centerline D of the lens and either adjacent to, or overlying the centerline.

In a particularly preferred embodiment of the present invention, the hybrid lens for eyeglasses comprises a frame-mountable, optically transparent lens having an upper edge and a lower edge and an anterior surface therebetween. The anterior surface has a lens surface area comprising an upper transparent portion, a lower transparent portion and a midportion therebetween. The midportion of the lens is a horizontal band centered on the centerline of the lens and bounded by the upper transparent portion on the top edge thereof and by the lower transparent portion on the lower edge thereof. The upper transparent portion, the lower transparent portion and the midportion are substantially equal in area. The polarizing segment is affixed to, and disposed entirely within the midportion of the lens surface area. As with the above-described embodiments, in the particularly preferred embodiment the polarizing segment is an elongate strip of a sheet polarizer having a strip length and an axis of polarization oriented orthogonal to the strip length. The polarizing segment is affixed to the midportion of the optically transparent lens by adhesive means. Alternatively, the polarizing segment may be laminated into the optically transparent lens such that it is disposed entirely within the midportion.

The incorporation of hybrid lenses into eyewear in accordance with the present invention reduces glare from oncoming headlights and streetlamps, particularly when there is rain present on the highway. By viewing the portion of the exterior environment (i.e., the portion of the exterior environment that is visible through the windshield) through the polarized segment of the lens(es), the wearer can view the painted line markers on the road with greater clarity than with the unpolarized, transparent portion of the lens, either during the day or at night. The lens of the present invention can be made either with or without a prescription, a tint or adjustable tint technology.

Lenses in accordance with the present invention are preferably manufactured as ophthalmic lens blanks at a predetermined polarized zone placement. The wearer is measured for pupillary distance and then the seg height is measured as is done in aspheric, flat top bifocals and progressive multi-focal designs. This is done whether a wearer needs a prescription or not. Lens blanks are then edged to fit a frame of the wearer's choice. While the principal application for lenses of the present invention is in custom spectacles, the lens system also has potential use in ready-made OTC driving glasses as stickon's or clip-on's for attachment to prescription glasses. The present hybrid lens system also has advantages over prior art polarized lenses that is particularly useful in aviation. The present lens provides aviation glasses wherein the polarized segment limits glare, but also enables the safe viewing of all of the cockpit instruments through the nonpolarized upper 16 and lower 17 sections of the lens 14.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What I claim is:

1. In a hybrid lens for eyeglasses, said eyeglasses comprising a frame-mountable, optically transparent lens having an upper edge and a lower edge and an anterior surface therebetween, said anterior surface having a lens surface area comprising an upper transparent portion, a lower transparent portion and a midportion therebetween, said upper transparent portion, said lower transparent portion and said midportion being substantially equal in area, the improvement comprising a polarizing segment affixed to and disposed entirely within said midportion of said lens surface area.

2. The hybrid lens of claim 1 wherein said polarizing segment is an elongate strip of a sheet polarizer having a strip length and an axis of polarization oriented orthogonal to said strip length.

3. The hybrid lens of claim 2 wherein said optically transparent lens has a top edge, a bottom edge and a geometric centerline midway between said top edge and said bottom edge and wherein said centerline substantially bisects said midportion of said lens and wherein said polarizer segment is disposed on said lens to overlie said centerline with said strip length parallel to said centerline.

4. The hybrid lens of claim 3 wherein said polarizing segment is laminated into said optically transparent lens.

5. The hybrid lens of claim 1 wherein said polarizing segment is affixed to said optically transparent lens by adhesive means.

* * * * *